United States Patent [19]
Barkley

[11] 3,921,154
[45] Nov. 18, 1975

[54] ELECTRIC POLARIZATION DOMAIN DEVICE AND METHOD

[75] Inventor: John R. Barkley, Wilmington, Del.

[73] Assignee: E. I. Du Pont de Nemours and Co., Wilmington, Del.

[22] Filed: Nov. 9, 1973

[21] Appl. No.: 414,250

[52] U.S. Cl. ..... 340/173 MS; 340/173 R; 340/173.2
[51] Int. Cl.² .......................................... G11C 11/22
[58] Field of Search ....... 340/173 R, 173.2, 173 MS

[56] References Cited
UNITED STATES PATENTS
3,825,910   5/1972   Carr ............................ 340/173 MS

*Primary Examiner*—Terrell W. Fears
*Attorney, Agent, or Firm*—Howson and Howson

[57] ABSTRACT

Domain tips in a single crystal of gadolinium molybdate or similar material are controllably produced, stabilized and moved at a speed which can be very high, in a manner suitable for information storage, logic operations, and light control applications. In one form, an elongated blade domain having its tip spaced inwardly from an edge of a C-cut crystal is stored and controllably extended and contracted along its length so that its tip occupies different stabilized positions; the crystal is a coupled ferroelastic-ferroelectric material exhibiting uniaxial electric polarization. The blade is extended by applying a supportive electric or stress field to the blade region, is stabilized in position by applying the opposite or inhibiting polarity of stress or electric field to portions of the crystal outside of the blade region and adjacent the desired tip position, and is contracted by applying an opposing or inhibiting electric or stress field to the blade. In another form, elongated lens domains are produced, the opposite ends or tips of which are both spaced inwardly from the crystal edges toward which they extend, and such lenses are moved along the direction of their lengths to various desired positions and extended or contracted as desired; again, supportive fields are used to extend the lengths of the lenses, opposite or inhibiting fields are used to stabilize the lens lengths and positions, and opposite or inhibiting fields are applied without supportive fields to reduce lens lengths or to annihilate the lenses. Such a lens domain is produced by forming a blade, extending it to a desired position, and amputating it by means of voltages applied to localized electrodes on the crystal so as to leave the isolated lens. The source of the blade may comprise blade storage means in the form of an unelectroded wedge-shaped region in an otherwise electroded portion of the crystal. Controlled motion of a lens is accomplished by a three-phase voltage which applies a new supportive field just ahead of the leading tip of the lens to extend it in that direction, and, while applying a supportive field to the central portion of the lens, applies an opposite field to the trailing portion of the lens to eliminate this trailing portion; this sequence is repeated cyclically to advance the lens progressively further. Annihilation of a lens can be accomplished by removing the supportive field. Electronic, optical or other sensing of the positions of the blade and/or lens domains may be employed, and a special electrical detector system is used to sense exiting of lenses from the output end of the crystal.

47 Claims, 23 Drawing Figures

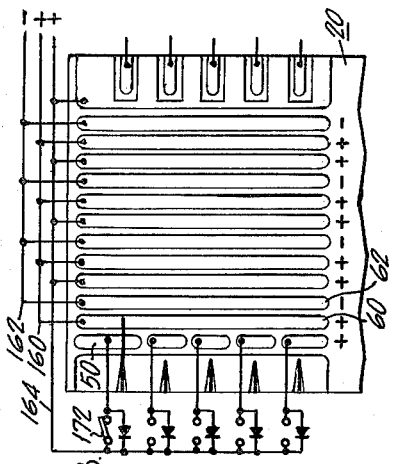
FIG.8B. (AT TIME T3)
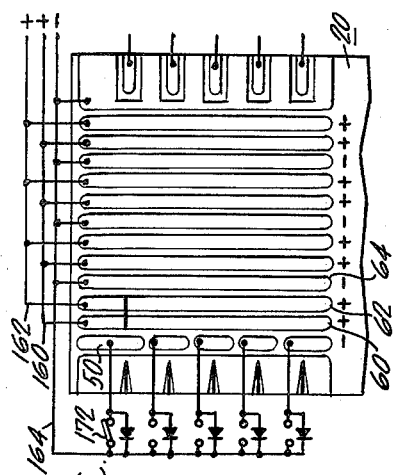
FIG.8C. (AT TIME T4)
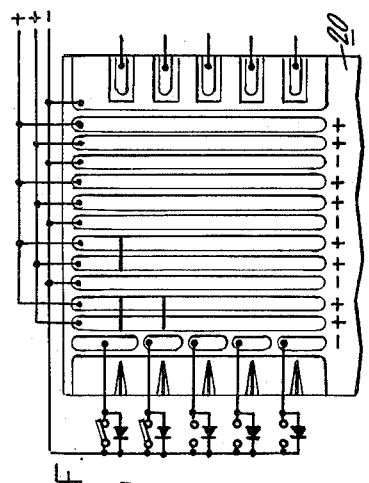
FIG.8F. (AT TIME T7)
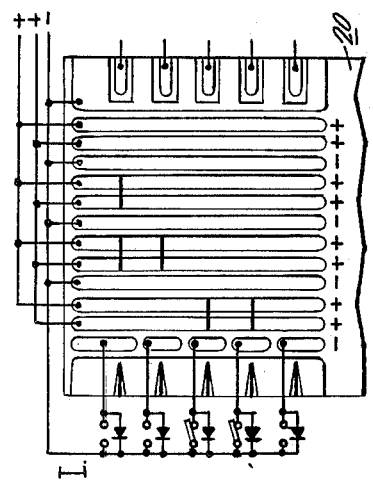
FIG.8I. (AT TIME T10)
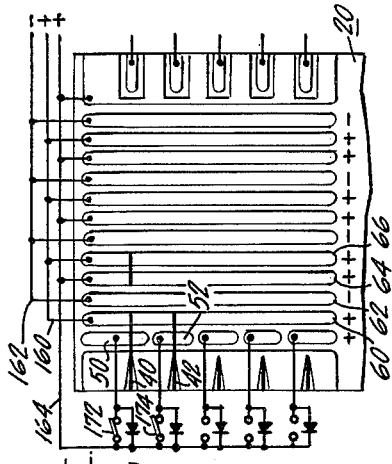
FIG.8E. (AT TIME T6)
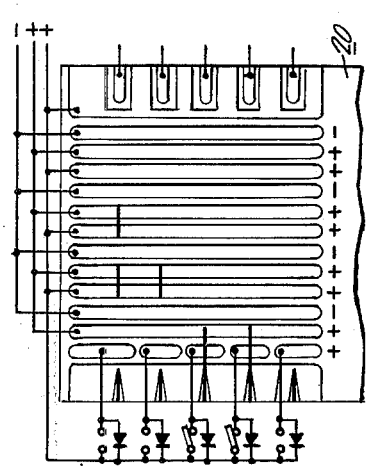
FIG.8H. (AT TIME T9)
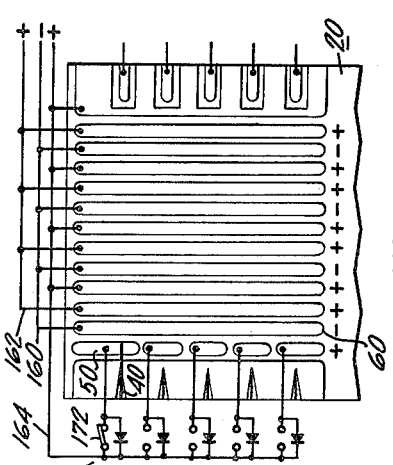
FIG.8A. (AT TIME T2)
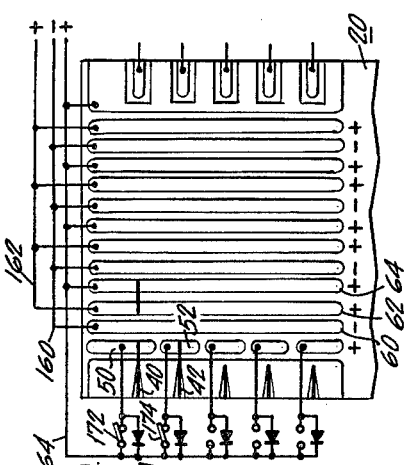
FIG.8D. (AT TIME T5)
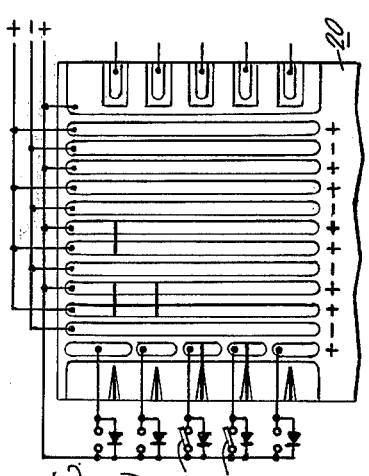
FIG.8G. (AT TIME T8)

ELECTRIC POLARIZATION DOMAIN DEVICE AND METHOD

BACKGROUND OF THE INVENTION

Devices, systems and methods are known in the prior art which involve the production and control of domains of reversed direction of electric polarization and strain field, in single crystals which exhibit uniaxial polarization and have coupled ferroelastic-ferroelectric properties. In such devices, the material of the single crystal, of which gadolinium molybdate is an important example, is ferroelectric in the sense that it exhibits two different spontaneous electric polarization states, both of which are stable and between which it can be switched by the application of different electric fields. It is ferroelastic in the sense that it exhibits two different stable strain states between which it can be switched by the application of different stresses thereto. The ferroelectric-ferroelastic properties are coupled in that the strain state and polarization state both change, and in a similar manner, in response to changes in either applied electric field or stress. The material exhibits uniaxial polarization in that the direction of the electric polarization vector in the material is always along a predetermined direction with respect to the crystal, although its magnitude and sense may change, and in fact the sense of this vector does switch between opposite directions for the two opposite ferroelectric and ferroelastic states. While in the preferred materials the electric polarization vector can inherently occur only along a predetermined direction therein, it is possible to utilize materials inherently having other possible directions of electric polarization if the material is so constrained as to exhibit electric polarization only along one direction, and such materials so constrained are said to exhibit uniaxial polarization.

The classes of single crystals capable of exhibiting coupled ferroelectric-ferroelastic properties and uniaxial electric polarization can be defined by their Aizu point groups, as set forth hereinafter. Among these materials, for example, are the alkali metal dihydrogen phosphates such as potassium dihydrogen phosphate (which however must be operated substantially below room temperature), certain borocites, and even Rochelle salt, but preferred materials with particular reference to which preferred embodiments of the invention will be described are the rare earth molybdates, especially gadolinium molybdate.

The mode of preparation and basic physical and optical properties of the rare earth molybdates, especially gadolinium are described for example in the U.S. Pat. No. 3,437,432, issued Apr. 8, 1966 to H. J. Borchardt and in the article by Kumada appearing in the periodical *Ferroelectrics*, Vol. 3, pp. 115-123, 1972. The system of specification of crystals by Aizu point groups is set forth, for example, in the article entitled "Possible Ferroelectric and Ferroelastic Crystals and or Simultaneous Ferroelectric and Ferroelastic Crystals" by K. Aizu, appearing in *Journal of the Physical Society of Japan* (27, 387, 1969).

It is known in the prior art that it is not necessary for an entire single crystal of such material to be entirely in one or the other of its two stable ferroelastic-ferroelectric states at a given time, but instead one portion thereof may be in one state and another portion in the opposite state. The portions which are in different states are known as domains, and the boundaries separating a region in one state from a region in the opposite state are known as domain walls. For example, a domain wall may extend completely across the major faces of a single crystal plate, separating it into two opposite domains. Such a domain wall may be caused to traverse the crystal from one end to the other by the application of appropriate electric fields or mechanical stresses. Because the two domains in such a plate exhibit different optical birefringences, the latter type of device utilizing a domain wall extending entirely across a single crystal plate and sweeping broadside along the plate can be used as an optical shutter. Such so-called planar domain walls can also be stabilized in position, stored where desired, and moved from one predetermined position to another by means of localized electrodes on one or more major faces of the crystal plate.

Furthermore, it is known in the prior art that a narrow domain in the nature of a strip extending entirely across such a single plate can be formed, bounded by two adjacent parallel planar domain walls and by the two opposite edges of the crystal plate. Such a planar domain can be formed, stored, moved to a variety of successive positions, and annihilated, by means of localized electrodes on one or more major surfaces of the plate and by appropriate control voltages applied thereto to control the local fields at various positions in the single crystal. Such arrangements can be used, for example, in dark-line or bright-line optical scanners.

It is also known to use such domains for information storage or logic functions; for example, the existence of a reverse domain may represent a binary 1 and its absence a binary zero, and successive planar reverse domains may be entered into the plate at one end and moved along therein in response to voltages applied to successive localized electrodes, to produce a number-representing array of such domains in the crystal plate, or, for example, to provide a shift register function.

Readout or sensing of domains has also been performed in the prior art by optical means, typically using polarized light, quarterwave retardation plates and suitable optical analyzers for example, whereby a light pattern corresponding to the arrangement of the domains is produced and detected. It has also been proposed to accomplish readout by applying to the plate an electric field which will reverse one domain state and not affect the other state, the reversal of the first domain state producing an electrically-sensible output indication of the reverse domain.

The above-described planar walls and domains formed thereby have been found to be quite stable in configuration and position in materials of the type described above. However, their movement transverse to the domain walls has been found to be relatively slow, specifically at a maximum velocity of about 200 to 300 centimeters per second. In certain applications, such as in optical scanners or information storage devices, higher rates of movement are desirable. Furthermore, where such a planar-walled domain is used to represent numerical information, the fact that each such domain and domain wall extends entirely across the crystal plate means that only a one-dimensional array of stored information can be provided, and hence the density of storage of information is limited.

In addition to such planar domains and domain walls, in some instances there have been observed random, unstable, useless, and generally harmful domains which do not extend entirely across the face of the crystal, but instead appear as elongated "islands" both tips of which are spaced inwardly from the crystal edges toward which they extend, or as elongated blades which extend from one edge of the crystal but only part way to the opposite crystal edge. Such anomolous domains sometimes arise during the making of the crystal plate, and if so are eliminated as nuisances; or they may arise accidentally or unintentionally during use of a crystal device, in a manner to interfere with the desired planar domain operation, and in such instances are intentionally suppressed by various techniques. See for example the German patent Offenlegungsschrift for patent specification 2,232,000, Offenlegung Jan. 11, 1973.

The prior literature also discloses the formation in potassium dihydrogen phosphate of domains extending along the a or b axes in c-cut plates and having a needle-like configuration in cross-section, the opposite tips of which needles do not extend to an edge of the plate and the lengths of which needles can be varied by varying the applied electric field. Such basic scientific studies are described in the following publications: article by Bornarel & Lajzerowicz at pages 4339 to 4341 of the August 1968 *Journal of Applied Physics*, Volume 39, No. 9; article by Bornarel & Lajzerowicz appearing at pages 177 to 187 of the 1972 publication *Ferroelectrics*, Volume 4; and Bornarel article appearing in the March 1972 *Journal of Applied Physics*, Volume 43, No. 3, beginning at page 845.

In addition, copending U.S. Pat. application Ser. No. 318,502 of Richard B. Flippen, filed Dec. 26, 1972 and entitled "Ferroelastic Crystals Switched By Motion Of A Domain Wall Having A Zig Zag Configuration," and of common assignee herewith, discloses and claims a controlled domain device utilizing a domain wall extending between opposite edges of a ferroelastic crystal, but in which the wall has a zig-zag configuration and can therefore be moved more rapidly transversely to the general direction of extension of the wall at a higher rate than a similar wall which is flat.

It is an object of the present invention to provide a new and useful controlled domain device, and method for producing and operating same.

It is also an object of the invention to provide such device and method which permit rapid, controlled changes in the configurations and/or positions of domains therein.

A further object is to provide such device and method which are adapted to permit presentation of a high density of information in a single-crystal domain device.

Another object is to provide new and useful apparatus and method for the controlled generation, stabilization and movement of blade and lens domains.

Another object is to provide a new and useful means for electrically detecting domains in a crystal.

SUMMARY OF THE INVENTION

In accordance with this invention there is provided a controlled domain device comprising a single crystal of a coupled ferroelastic-ferroelectric material exhibiting uniaxial electric polarization, means for producing in said single crystal a domain region at least one portion of which: (a) is elongated along a predetermined twinning plane in said crystal; (b) has at least one tip which is spaced inwardly from that surface of said crystal toward which said tip extends, and (c) extends less than completely across said crystal in a direction perpendicular to said direction of elongation; means for producing localized electric and/or strain fields in said single crystal adjacent said tip, selectively to control the position of said tip.

The domain tip is preferably stabilized by applying a domain-supportive field to the portion of the crystal within the domain tip and applying a domain-inhibiting field to the portion of the crystal adjacent the tip and outside the domain. These space-variant fields are preferably applied by means of spacedapart electrodes on the crystal, to which electrodes different voltages are applied. Motion of the tip is accomplished by varying the applied local control fields as a function of time to change the positions of the domain-supportive and domain-inhibiting fields with respect to the crystal. The positions of the latter fields can be changed very rapidly along the direction of elongation of the domain to move the tip very rapidly yet controlledly.

In one embodiment of the invention the domain is a blade domain — that is, a domain elongated parallel to a twinning plane in said crystal and having a tip spaced inwardly from the edge of said crystal toward which the tip extends, the opposite end of said blade domain being open to another edge of said crystal in that it either extends parallel to said twinning plane to said other edge or merges continuously with a domain of the same state which in turn extends to some edge or edges of said crystal. The present invention enables controlled generation and motion of the tip of the blade domain parallel to a twinning plane so as to extend or contract the blade to any of a variety of selected lengths in response to localized fields applied to the crystal.

In another embodiment of the invention the elongated domain is an "island" or "lens" domain, so-called herein because the two opposite tips of the domain are both spaced inwardly from the corresponding opposite surfaces of said crystal and because the cross-section of the domain bears a general resemblance to the cross-section of an optical converging lens, especially when the domain is relatively short. The lens domain is controlledly generated, extended, contracted and/or moved along the direction of its length and stabilized in one or more desired configurations and positions. The motion of the domain tips provided by the invention can be much faster than the maximum speed of motion of a flat, planar domain wall transverse to the plane of the wall as provided in the prior art, for example 30 times faster, with attendant advantages for high-speed operations.

In one preferred ambodiment, a lens domain is produced by generating a blade domain and then annihilating a portion of the blade domain to leave a residual amputated lens domain and a shortened blade domain. Preferably the blade domain is generated and stored in a contracted state, is extended and amputated when a lens is to be produced, and is then caused to contract to its original stored configuration.

The ability to create and control domain tips makes possible rapidly-acting and reliable devices according to the invention in which the existence and position of a domain is informationally significant with respect to two dimensions in a single crystal, rather than only with respect to one dimension as in previously known devices. More particularly, it has been previously known to produce domain walls extending entirely across a single crystal and to move such walls transversely to different controlled positions; in this way an array of domains can be produced which represents binary number information as read along a single dimension generally normal to the domain walls. In accordance with one preferred embodiment of the present invention, in contrast, an array of domains is provided and controlled in a single crystal so that information is represented along two dimensions and a greater density of number information thereby provided in the crystal.

In one preferred embodiment of the invention useful to store binary information, blades are formed and stored along one edge of the crystal plate by providing unelectroded wedge-shaped surface regions of high electrical surface resistance in an otherwise electroded surface along said edge, and then causing a domain wall to sweep through said crystal along said edge to form and retain a stored blade in each wedge-shaped region. An input or gating electrode is provided adjacent and aligned with the tip of each blade whereby a supportive voltage applied to selected ones of the input electrodes will extend the corresponding blade domain to include a region under that input electrode. One or more further electrodes positioned adjacent all of the input electrodes are then supplied with a supportive voltage to cause a blade extending under an input electrode to be further extended to the crystal region under the further one or more electrodes. To stabilize the position of the tip of the blade in any of its extended states, a reverse inhibiting voltage is applied to an electrode positioned just beyond the blade tip. To form a lens from any of the extended blades, an inhibiting or annihilating voltage of reversed polarity is applied to the corresponding input electrode to eliminate the portion of the blade under it, leaving a stabilized lens under the further electrodes and causing the previously-extended blade to contract to its original stored configuration where it is held available for subsequent repeated use in forming additional lenses when so desired. The blade domains therefore define lens paths or channels extending along twinning planes in the crystal such that lenses can be introduced into any desired combination of channels and moved controlledly along the selected channels or stabilized in position therein as desired. In this way lenses can be arranged in two-dimensional arrays in the crystal to represent number information, for example.

In other embodiments, blades are extended or contracted to stable controlled lengths so as to represent number information or for any other desired purpose, without requiring the generation or use of lens domains.

Sensing or readout of the blade or lens domains can be accomplished optically due to their distinctive birefringence characteristics, or by other means such as electrical sensing or readout. In one preferred embodiment the arrival of a lens domain at an edge of the crystal and its expulsion from the crystal are sensed by a detector electrode adjacent that edge of the crystal and an external electrical circuit connected to the detector electrode across which a distinguishable voltage is developed in response to expulsion of the lens domain from the crystal.

Lens or blade domains can also be generated by producing strain gradients in the crystal where the lens or blade is to be generated, as by mechanically-induced crystal damage, by localized heating of the crystal and/or application of electric field gradients.

The invention embodies other detailed features not readily set forth in this summary, but described and claimed hereinafter.

BRIEF DESCRIPTION OF FIGURES

Other objects and features of the invention will be more readily understood from a consideration of the following detailed description, taken with the accompanying drawings, which are not necessarily to scale, and in which:

FIG. 8A through 8I are fragmentary schematic representations, with parts omitted, of the domain device of FIG. 2, showing blade and lens domain locations and configurations occurring during one preferred type of operation of this embodiment of the invention;

DETAILED DESCRIPTION OF SPECIFIC EMBODIMENT

Figure 1:
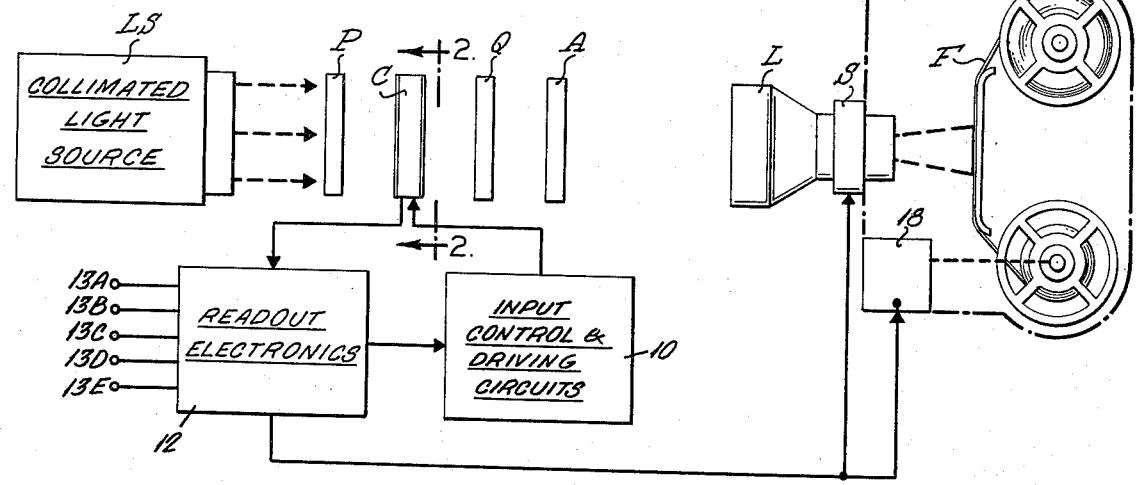
FIG. 1 is a schematic representation of one form of optical system in connection with which a controlled domain device according to the invention can be used when optical sensing of domains is desired.

Referring now by way of example only to the specific embodiments of the invention illustrated in the drawings and without any way thereby limiting the generality of the disclosure or the scope of the claims, FIG. 1 illustrates schematically one general type of system in which the invention is useful. A collimated light source LS generates a beam of collimated light which is impingent on polarizer P. One convenient light source for this purpose is a laser, but other and simpler collimated light sources may be used employing non-coherent light, preferably substantially monochromatic light. The polarizer P causes the light passing through it to be linearly polarized along a predetermined direction fixed with respect to the polarizer, and materials suitable for this purpose are well known in the art. The linearly polarized light from polarizer P is applied to one major face of a crystal plate constructed, arranged and controlled in accordance with the invention so as to have controlled localized reverse domains therein, the optical birefringence of the crystal being of opposite signs in regions thereof having opposite electric polarizations. Various electrodes are provided on the major faces of the crystal plate C, but these are so thin as to be transparent so that light can readily pass through them. Preferably in this example crystal plate C itself has a thickness such as to constitute a quarterwave plate, whereby the accumulated phase difference between the electromagnetic radiations comprising the ordinary and extraordinary rays in the crystal plate is substantially one-quarter of a wavelength of the radiation. As a result, the light exiting from the crystal plate C is circularly polarized, as is well known to occur when linearly polarized light is passed through a quarterwave plate. The circularly polarized light then passes through the quaterwave plate Q, which may be of any suitable material for this process, and then passes through an analyzer plate A, which may be a linearly polarizing plate aligned parallel to, or at right angles to, the direction of linear polarization provided by polarizer P.

As is well known in the prior art, the light passing through analyzer A after having passed through a domain state of one electric polarization in crystal C will have a distinctly different intensity than light passing through portions of crystal C of opposite electric polarization. For example, depending upon whether the direction of analyzer A is set parallel or normal to the direction of polarizer P, light from analyzer A which has passed through a reverse domain of one direction of electric polarization in crystal C will appear either very bright or very dark compared to light passing through other portions of the crystal having the opposite direction of electric polarization.

Light passing through analyzer A is imaged or focused on photosensitive film F by means of lens L when shutter S is open, and is prevented from reaching the film when the shutter is closed. Film F, when developed, will therefore present a permanent photographic image or picture of the domain array in crystal C, localized reverse domains appearing either as light regions on a dark background or dark regions on a light background depending on the orientation of analyzer A and, of course, depending on whether the developed film is a positive or a negative photographic image. It will be appreciated that the combination of lens L, shutter S and film F together may constitute a conventional camera arrangement, preferably in this case with an electrically-controllable shutter and electrically-controlled rapid film-advance mechanism.

Crystal C is a single crystal plate of a coupled ferroelastic-ferroelectric material exhibiting uniaxial electric polarization, and together with various electrodes thereon constitutes a controlled-domain device. The existence, location, configuration and motion of reversed domains in the crystal are controlled by localized electric and/or strain fields, in this example in response to voltages supplied thereto from input control and driving circuits 10, to be described hereinafter.

In this particular example, output signals from the controlled-domain device are supplied to readout electronics 12 which in turn produces output electrical signals on its output leads 13A, 13B, 13C, 13D, 13E representative of certain domain conditions in crystal C, to be described hereinafter. These signals may be used for monitoring or control purposes as desired, and may if desired also be supplied as shown to the input control and driving circuits 10 to control the timing of the operations thereof, to the shutter S to control its operation, and/or to the automatic film-advance means 18 to control the timing of film advancement as desired. FIG. 1 therefore respresents a general system arrangement in which an array of reverse domains can be produced and controlled in crystal C, recorded on a photosensitive film when desired, the film advanced to permit a photographic record of a later-produced domain array, and this process repeated as often as desired.

It will be understood that the general arrangement shown in FIG. 1 is not in itself new as broadly represented therein, but is merely intended to represent one possible use of the present invention. The present invention relates instead primarily to the nature of the controlled-domain device and to the method and apparatus for its operation and use, whether in the system shown or in other widely different systems. The invention will, however, be described by way of example primarily in connection with arrangements in which arrays of reverse domains are produced in the single-crystal plate to represent binary number information supplied thereto from circuits 10, which number information in the form of domain arrays is photographed and converted to a permanent record on the film F.

FIGS. 2–6 illustrate one such embodiment of the invention in which there is provided a rectangular single-crystal plate 20 of a coupled ferroelastic-ferroelectric material exhibiting uniaxial electric polarization, preferably but not necessarily gadolinium molybdate in its $\beta'$ phase, with its major faces extending perpendicular to the $c$ crystal axis and its edges cut in the (110) and (1$\overline{1}$0) planes so that the $a$ and $b$ crystal axes are at 45° to the crystal edges. In this embodiment, plate 20 is a quarterwave plate, and in the case of gadolinium molybdate is therefore about 0.38 millimeters in thickness, while the area of the major faces in this example may be about 1 centimeter by 1 centimeter.

The manner of preparing such plates suitable for the present purposes being well known in the art, it need not be described therein in detail. Typically, particularly in the case of gadolinium molybdate (GMO), a single-crystal boule is grown by seed techniques, and slabs are cut from the boule in the $c$ plane, polished, and coated, as by sputter-deposition, on both major faces with a thin transparent electrically-conducting film of a material such as $In_2O_3$. The individual rectangular plates of smaller size are cut from these slabs by conventional techniques.

There is therefore provided over one side of the crystal plate (the rear face in FIG. 2) a transparent electrically-conductive coating or electrode 22. A plurality of separate, discrete, localized transparent electrodes are then formed on the opposite or top face as viewed in FIG. 2; this may be accomplished, for example, by using photoresist masking techniques to cover and protect the portions of the conductive coating which are to remain as electrodes, and utilizing sputter-etching techinques to remove the conductive coating in the regions to be unelectroded.

Figure 2:
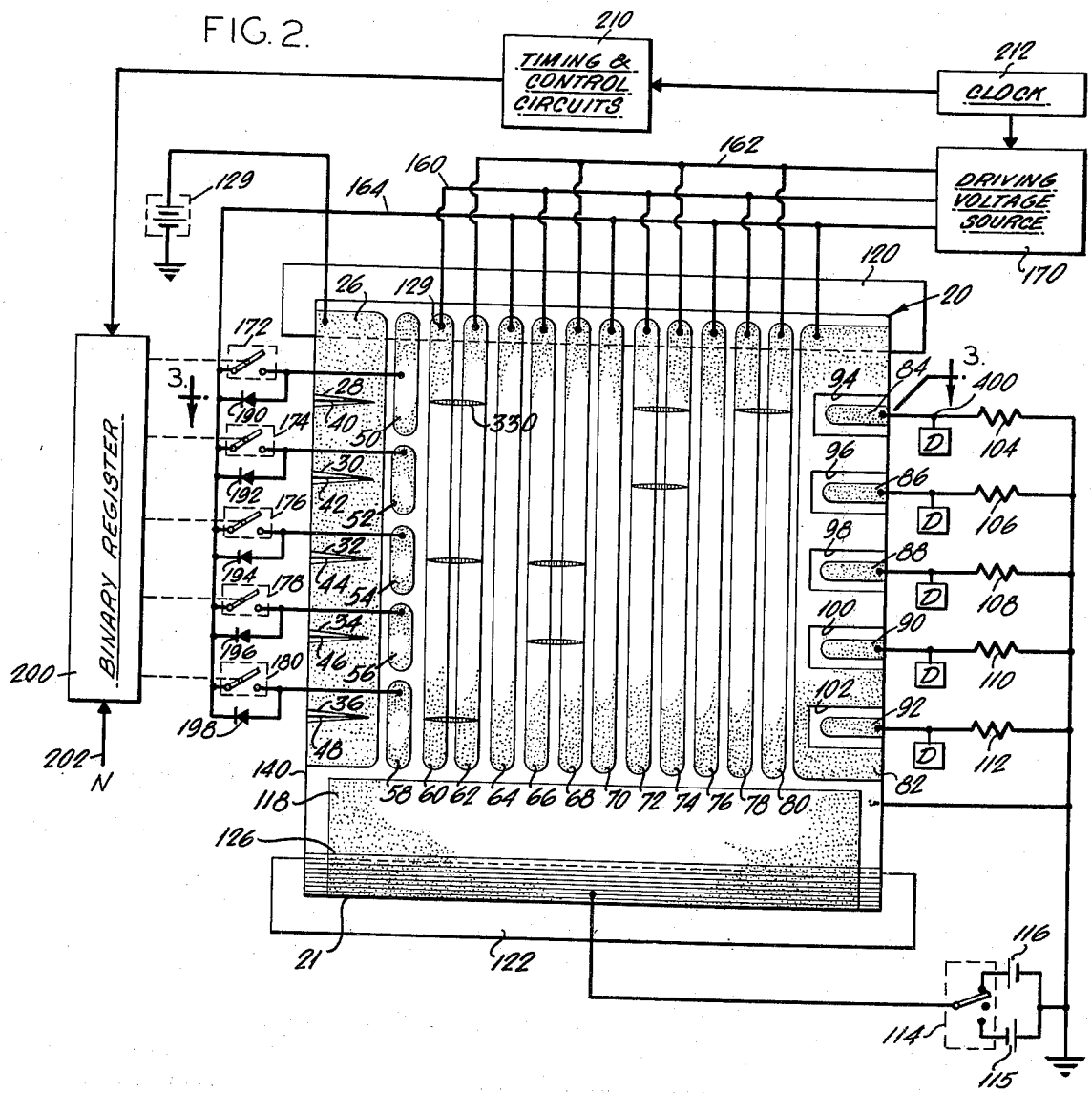
FIG. 2 is a schematic representation showing in top view a single-crystal controlled domain device with electrical appurtenances for operating it, in accordance with one preferred embodiment of the invention, but with the preferred protective surface layer omitted in the interest of clarity.

More particularly, in this embodiment the following localized electrodes are provided on the upper face of the crystal. Along a portion of the left-hand margin of the top surface as viewed in FIG. 2 there is provided a blade storage electrode 26 defining a plurality (in this example five) of wedge-shaped unelectroded regions 28, 30, 32, 34 and 36. A typical wedge-shaped unelectroded region 28 is shown more clearly in the enlarged view of FIG. 4, it being understood that the wedge-shaped regions as shown in FIG. 2 are represented with a greater width than they would actually typically possess in order for them to show clearly in the drawing. The base of each of these wedge-shaped unelectroded regions extends to the adjacent edge of the single-crystal plate, while the apex thereof is positioned near the opposite edge of the electrode 26. The purpose of these unelectroded wedge-shaped regions, as is described more fully hereinafter, is to provide for generation and storage of respective associated blade domains 40, 42, 44, 46 and 48.

Also provided are a corresponding set of input, or gating, electrodes 50, 52, 54, 56 and 58, each electrically isolated from the other and from the blade storage electrode, and each having a portion aligned with the apex of a different one of the wedgeshaped unelectroded regions corresponding thereto. As will be described, these input electrodes are for the purpose of permitting the selective extension of any desired combination of the stored blades outward from beneath electrode 26, to a position for which the selected blade tip or tips lie substantially directly under the far edge of the corresponding input or gating electrode.

Also provided is a set of rectangular, mutually spaced-apart lens driving electrodes 60, 62, 64, 66, 68, 70, 72, 74, 76, 78 and 80. Each of these latter electrodes extends in front of all of the wedge-shaped unelectroded regions and their respective associated stored blade domains, as shown. As described hereinafter, the lens driving electrodes are used in connection with extending a selected blade domain, amputating it to form a lens, and moving the lens progressively along the plate to the right as shown in FIG. 2, under the control of applied voltages.

In addition, there is provided a final or exit electrode 82 extending along the extreme right-hand portion of the top surface of crystal plate as viewed in FIG. 2, and in this example having a width about the same as the distance along the plate occupied by any adjacent pair of the driving electrodes such as 78 and 80 for example. At the right-hand edge of the crystal, and aligned respectively with each of the blades 40, 42, 44, 46 and 48, are corresponding respective detector electrodes 84, 86, 88, 90, and 92, each positioned within a corresponding, respective unelectroded or cutout region 94, 96, 98, 100 and 102 of rectangular shape in the final electrode 82. Each of the latter cutouts extends from the right-hand edge of the plate as viewed in FIG. 2 to position near but spaced from the left-hand edge of electrode 82. Each of the detector electrodes extends from the right-hand edge of the crystal plate 20 to a position within but adjacent the left-hand end of its corresponding cutout, and the sides of each detector electrode are also spaced from the adjacent portions of the final electrode, so as to be electrically insulated therefrom. As will be described, the final electrode 82 serves the purpose of causing the lens to exit from the right-hand end of the crystal 20 when it has been moved thereto by the driving electrodes, and the detector electrodes are for deriving an indication of when a particular lens reaches final electrode 82 and exits from the crystal 20. Thus each detector electrode 84, 86, 88, 90 and 92 is connected through a corresponding respective load resistance 104, 106, 108, 110, 112 to the rear electrode 22, here designated as maintained at ground potential, and is also connected to respective output signal discriminator circuits D for producing an output signal only when a lens is moving under the corresponding detector electrode.

Also provided is a wall-retaining electrode 118 extending parallel to the blade domains, along the bottom margin of the top of crystal 20 as viewed in FIG. 2, for purposes to be described.

Figure 3:
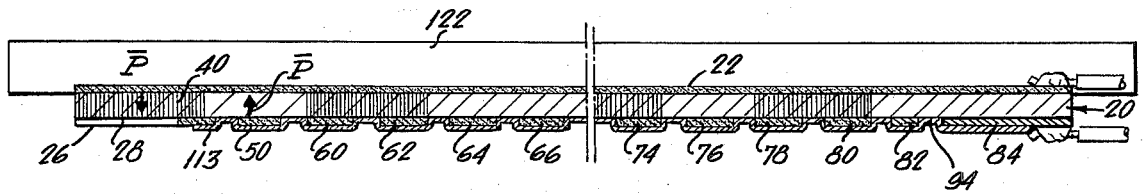
FIG. 3 is a cross-sectional view of the controlled domain device of FIG. 2, taken along lines 3—3 therein, and including the preferred surface layer.

Because of the relatively high voltages typically applied between the various adjacent electrodes, when they are very closely spaced there may be some tendency for arcing to occur between them. It is therefore preferred to coat at least the edges of such electrodes with an insulating inert substance such as silicon dioxide. Accordingly, a layer 113 of silicon dioxide is shown in FIG. 3 (but not in the other figures, for clarity of exposition), extending over the entire upper face of the crystal plate except for the portion containing the wedge-shaped unelectroded regions such as 28. The $SiO_2$ layer may be applied by conventional sputter deposition methods.

The crystal 20 with the aforedescribed electrodes thereon is then poled while it is immersed in a conducting liquid, for example in distilled water, so that a single domain wall 126 remains in the crystal plate, aligned parallel to the upper and lower edges of the crystal as shown in FIG. 2, i.e. parallel to the direction along which the lenses are to be moved. More particularly, such poling may be accomplished by first applying a conductive liquid to the entire surface of the multielectroded top face of the crystal plate as viewed in FIG. 2, including the unelectroded wedge-shaped regions, and then making the liquid electrode strongly negative with respect to the rear electrode 22 by means of the two-position switch 114 and the d.c. source 115. This converts the entire crystal plate to a single domain, any walls therein being expelled through crystal edge 21. Switch 114 is then thrown to the position to supply a strong positive voltage to electrode 188 from d.c. source 116, thus causing a domain wall 126 to form at edge 21 and move inwardly to the inner edge of electrode 118. If desired, instead of using voltages to pole the crystal, this may be done by mechanically squeezing the crystal along its diagonals while immersing the entire crystal and electrodes in a conducting liquid. Clamps 120 and 122 are cemented to the rear, or completely electroded, face of the crystal plate 20, extending completely along and beyond the two opposite edges at the top and bottom of the plate as seen in FIG. 2. After the clamps are applied, switch 114 is then operated to its opposite position to make electrode 118 strongly negative and to drive wall 126 to a stored position adjacent the inner edge of clamp 122, as shown in FIG. 2.

Such mechanical clamps, their function and mode of application are described for example in my U.S. Pat. No. 3,732,549, issued May 8, 1973. Each clamp is constructed of a rigid and preferably non-conducting material such as glass, and attached to the crystal plate so that deformation of the crystal under the clamp is prevented. The clamps define clamped zones, each extending completely along the length of the crystal and having at least one edge extending parallel to the blade domains, i.e. along the length of the blades and lenses to be formed in the crystal; in the case of gadolinium molybdate, this direction is parallel to the (110) plane. The clamps inhibit the formation of domain walls extending normal to the cemented edges of the clamps, and along any direction other than the desired direction parallel to the clamp. Each clamp can be cemented to the crystal using a cement which does not shrink on setting, so that strain is avoided which could induce unwanted domains under the region covered by the clamp. It is generally important to obtain a cement line at the edge of the clamp which is linear and accurately aligned along the desired direction. A suitable cement and mode of application thereof is described in my above-identified U.S. Pat. No. 3,732,549.

Either one of the clamp 120 and 122 may be secured to a support for mounting the crystal plate in the desired position, while the other is left free to move relative to the mounting clamp so that the domain wall 126 produced by the poling operation can move sideways, i.e. transverse to its plane, in the crystal plate in response to applied voltage or stresses when such operation is desired.

Separate wires or leads are connected to each of the electrodes on the crystal plate 20 at positions which will not interfere with the desired transmission of light through the blades and lenses during operation, and which will not introduce mechanical constraints into the crystal near the blade or lens channels. For example, wires may be secured with indium solder or conducting epoxy cement as at 129 (FIG. 2) within the area clamped by clamp 120. In other embodiments the leads may be applied conveniently and without creating constraints by known printed-circuit or microelectronic techniques.

Before the device of FIG. 2 is connected in the circuit shown, the stored blades are formed in the wedge-shaped unelectroded regions as follows. The stored planar domain wall 126 is caused to scan across the crystal plate 20 from its stored position adjacent clamp 122 to a position near the inner edge of the other clamp 120, and then back again to its stored position. As a result of this scanning by the planar domain wall 126, a reverse blade domain is produced and stored in each wedge-shaped region, these blade domains in this example being of the polarity to be supported by positive voltages applied to the top surface of the crystal with respect to the rear electrode. The desired scanning by the planar domain wall 126 can be produced by applying mechanical stresses along the diagonals of the crystal plate 20, but it is preferred to cause this scanning by the application of electrical fields. In one procedure, this is accomplished by first connecting all of the top electrodes on crystal plate 20 to a potential source strongly positive with respect to the rear electrode 22 to move the planar wall 126 to a position adjacent clamp 120, and then reversing the polarity of the potential applied to the top electrodes to move the planar wall back to its original stored position. While all of the details of why this results in production of a blade domain in each wedge-shaped region are not fully understood, the phenomenon is believed to occur because the unelectroded regions do not readily permit that redistribution of charge between opposite major surfaces of the crystal required for wall movement through the wedge regions. Preferably, but not necessarily, the wedge-shaped regions are moistened with a conductive liquid such as distilled water prior to the scanning of wall 126 from clamp 122 to clamp 120 to permit redistribution of charge and production of a reversed domain under each wedge-shaped region during this scanning by the domain wall, then dried thoroughly before the wall is returned to clamp 122 so that a reverse blade-domain is produced and retained in each wedge-shaped region.

Figure 4:
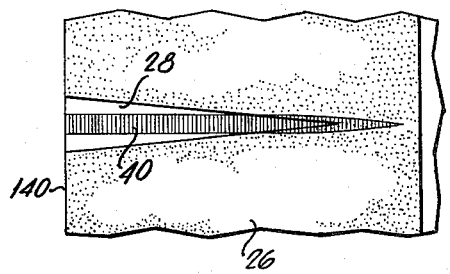
FIG. 4 is a fragmentary view of a portion of FIG. 2 showing more clearly a blade-generating wedge-shaped unelectroded region containing a blade domain, in accordance with one aspect of the invention.
Figure 5:
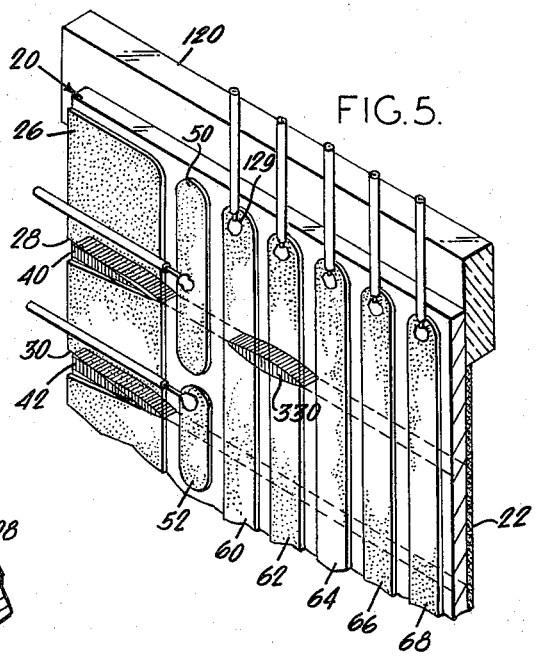
FIG. 5 is a fragmentary perspective view of a portion of the device of FIG. 2.

As shown more clearly in FIG. 4, each blade domain, such as 40, is open to and intersects the adjacent edge 140 of the crystal plate; for the most part, extends along a twinning plane, in this case along the (110) plane; and at its inner end the opposite walls thereof converge along the twinning plane which is the axial plane of the blade.

If because of a humid environment or for other reasons the surface of the crystal within the wedge regions becomes sufficiently conductive, the blades may at times exhibit a tendency to shrink and effectively move out of the adjacent edge 140 of the crystal. If this occurs, the wedges can be reloaded with blades in the same manner described above, or if desired the circuits next to be described can be connected so as to scan the wall 126 periodically across the crystal at appropriate times by setting the switches to be described to make all top electrodes first positive and then negative, thereby to assure presence of the blades at all necessary times.

The crystal domain device of FIG. 2 is then connected into the circuit as shown in FIG. 2. The blade forming electrode is preferably connected to a blade-supportive positive potential source 129 as an aid in maintaining the blades over long periods of time. Thus electrodes 60, 66, 72 and 78 are connected to driving bus 160, electrodes 62, 68, 74 and 80 are connected to driving bus 162, and electrodes 64, 70, and 76 are connected to driving bus 164. The driving buses 160, 162 and 164 are connected to, and supplied with driving voltage from, the driving voltage source 170. Driving bus 164 is also connected to one terminal of each of the single-pole single-throw switches 172, 174, 176, 178 and 180, the other terminals of which switches are connected directly to the gating electrodes 50, 52, 54, 56 and 58 respectively. The terminals of the latter switches are also interconnected by respective diodes 190, 192, 194, 196 and 198, each having its anode directly connected to its corresponding gating electrode. These diodes serve to block application of positive voltage to the driving electrodes from bus 164 except when one of the switches 172–180 is closed, but to permit application thereto of negative voltages from bus 164 at any time regardless of the status of the switches.

The switch arms of each of the above-mentioned switches are operated under the control of respective output signals from the binary register 200. Register 200 may be of known type into which binary number information is inserted by way of input line 202; the number in this example is assumed to be a five-digit binary number. Register 200 is operative, when actuated, to operate each of the respective associated switch arms in response to the information in each digit position in the register, for example to close each switch for which a 1 is present in the corresponding digit position and to open the switch where a zero is present. A conventional timing and control circuit 210 provides appropriate control signals to the register to time and control its operations. A common clock 212 may be used to provide common timing impulses for the timing and control circuit and for the driving voltage source 170.

Figure 6:
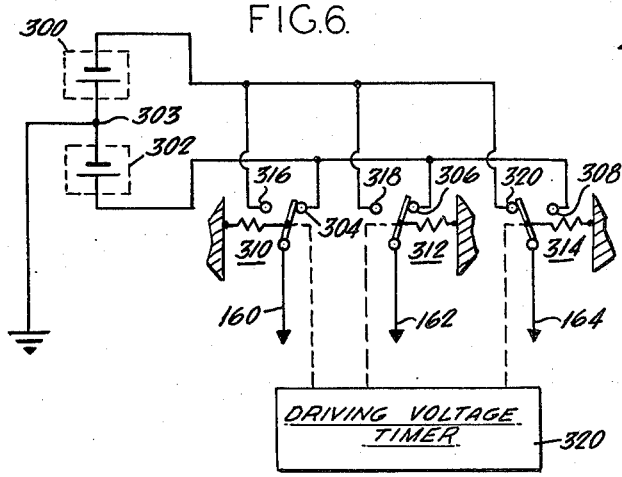
FIG. 6 is an electrical schematic diagram showing one functional arrangement for supplying the device of FIG. 2 with operating voltages to control the motions of lens domains and blade-domain tips therein.
Figure 7:
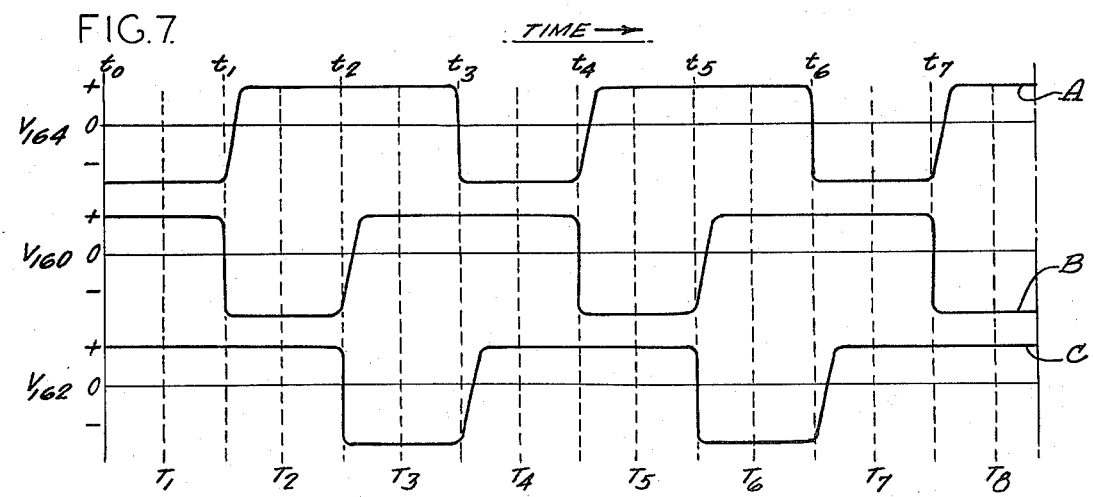
FIG. 7 is a set of three graphical representations illustrating preferred waveforms of voltage produced by the circuit of FIG. 6.

FIG. 6 illustrates schematically a suitable functional arrangement for the driving voltage source 170, and FIG. 7 illustrates suitable waveforms to be supplied to the driving buses 160, 162, and 164. In FIG. 6 there is shown a pair of direct-voltage sources 300 and 302 connected in series-aiding relation, with the common terminal 303 between them grounded. The positive terminal of source 302 is directly connected to the terminals 304, 306 and 308 of single-pole, double-throw switches 310, 312, and 314 respectively. The negative terminal of source 300 is directly connected to the other contacts 316, 318 and 320 of the same switches, respectively. The arm of switches 310 and 312 are shown spring-biased to their positively-biased contacts, while switch 314 is spring-biased to its negative contact. Each switch is thrown to its alternate position when desired, in response to the driving voltage timer 320. While the switches 310, 312 and 314 are shown for convenience as mechanical switches, and could in fact be such so as to be controlled manually or by appropriate solenoids, it will be understood that these switches will normally be electronic switches, electronically controlled. Thus, FIG. 6 merely illustrates schematically an arrangement for producing positive and negative voltages at will on the driving buses 160, 162, and 164, and the transition in voltage between any positive and negative state in any direction may be made gradual or abrupt, and of any desired contour, by appropriate design of the electronics employed according to conventional practices.

Curves A, B and C of FIG. 7 represent the voltages produced on buses 164, 160 and 162 respectively, according to one preferred switch timing arrangement for the present embodiment. In each curve, ordinates represent voltage with respect to the ground potential of rear electrode 22 (See FIG. 5) on crystal plate 20, and abscissae represent time to the same scale for the three curves. Abscissae are marked off into equal time intervals extending from $t_0$ to $t_7$, and the positive polarity of voltage is here assumed to be the polarity which is supportive of the reverse domains under the electrodes in crystal 20. It will be seen that the graphs A, B and C have the same waveform but are displaced from each other 120° in phase, to constitute a three-phase driving voltage system. Each individual waveform is positive for two-thirds of a cycle and negative for the other one-third cycle. Advantageously, the negative voltages are substantially greater than the positive voltages, and the transitions from negative to positive are somewhat delayed with respect to the transitions from positive to negative. The manner in which the three-phase driving voltage arrangement of FIG. 7 provides the desired operation of the present embodiment is best understood from a consideration of these waveforms in connection with the reduced-scale partial versions of FIG. 2 shown in FIGS. 8A through 8I and 9A to 9E, illustrating the state of the crystal domain device at successive times during its operation.

In this example it will be assumed that it is desired to produce in the crystal plate 20 an array of reverse domain lenses representing four binary numbers each having five digits, and then to photograph the array to provide a permanent record thereof. Merely by way of example, it will be assumed that these numbers are 00001, 00011, 01100, and 10101. A 1 is represented by the presence of a lens in crystal 20, the least significant digit being represented by the presence or absence of such lens in a channel or path extending between blade 40 and the center of detector electrode 84, the next more significant digit being represented in the channel or path extending along the direction from blade 42 to the center of detector electrode 86, and so forth. Accordingly, in FIG. 2 the number 00001 is represented by the single lens under electrodes 78 and 80; the number 00011 is represented by the two lenses under electrodes 72 and 74 in the two least-significant digit channels; the number 01100 is represented by the two lenses under the electrodes 66 and 68; and the remaining number 10101 is represented by the three lenses under electrodes 60, 62. In general, each lens domain will have two opposed walls extending parallel to twinning planes, which walls converge at each end of the lens, the lens also extending in this example entirely through the thickness of the plate as shown for example at 330 in the perspective view of FIG. 5. The manner in which the array of lenses shown in FIG. 2 is produced will now be described.

As shown in FIG. 7, during the interval $t_0 - t_1$ driving bus 164 is negative and buses 160 and 162 are positive, and the entry of the number 00001 is initiated by the action of the binary register 200 of FIG. 2 in closing switch 172 at time $T_1$ and leaving the other switches open. Since bus 164 is then negative, all of the gating electrodes are held negative through the diodes 190–198 and the blades remain stored. However, at time $t_1$, $V_{164}$ becomes positive and $V_{160}$ becomes negative, so that at the time $T_2$ depicted in FIG. 8A the blade 40 has been drawn out by the positive or supportive voltage on gating electrode 50 and extends under gating electrode 50 along the corresponding channel. At this time, the negative or inhibiting voltage applied to the first driving electrode 60 from lead 160 arrests further extension of the blade when its tip has reached a position approximately under the inward or downstream edge of the gating electrode 50. The blade 40 remains stabilized in this position until the time $t_2$. At a time between $t_2$ and $t_3$, such as $T_3$ in FIG. 7, the voltages on buses 164, 160 and 162 become respectively +, + and − to produce the sequence of electrode voltages shown in FIG. 8B along the bottom margin thereof. At this phase of the driving voltage cycle, the gating electrode 50 remains positive, the first driving electrode 60 becomes positive so as to extend the blade further along the channel under electrode 60, and the next driving electrode 62 becomes negative so as to arrest and stabilize the blade tip under the down-channel edge of electrode 62. Switch 172 remains closed during this time to supply the voltage from lead 164 to the gating electrode 50.

In the time interval between $t_3$ and $t_4$, e.g. at time $T_4$ in FIG. 7, the condition shown in FIG. 8C occurs. The voltage on bus 164 has become negative and the voltages on the other two buses are positive to produce the distribution of electrode voltages shown along the bottom margin thereof in FIG. 8C. The positive supportive voltage thus applied to driving electrode 62 causes the tip of the blade to move to the inward or down-channel side of the electrode 62 where it is arrested and stabilized by the negative voltage on the next electrode 64. At this time the voltage on gating electrode 50 has become negative, thus annihilating the portion of the blade previously underlying electrode 50, causing the blade to retreat to its original stored position and isolating the forward end of the original blade so as to produce a lens both ends of which are spaced from the opposite edges of the crystal plate 20 toward which they extend. The presence of this lens, and the absence of any lens along electrodes 60 and 62 in the other channels, represent the binary number 00001.

During the next complete cycle of the three-phase driving waveform (See FIG. 8D–8F), this lens is further advanced the distance of three driving electrodes, one electrode at a time, and the next binary number 00011 is entered. More particularly, at time $T_4$ the binary register causes both of switches 172 and 174 to be closed and, in the interval between $t_4$ and $t_5$, (for example at time $T_5$) the driving buses assume the same potentials which they had at time $T_2$, and the cycle of operation is repeated except that since switches 172 and 174 are now closed both blades 40 and 42 will be extended under the gating electrodes 50 and 52 respectively, as shown in FIG. 8D. Again, these blades are stabilized in position with their tips under the down-channel ends of their corresponding gating electrodes by the negative voltage applied to the first driving electrode 60. Also, the original first-produced lens in the least-significant-digit channel has moved down-channel by one electrode, due to the fact that the driving electrode ahead of it, namely electrode 64, has become positive to extend the forward tip of that lens under electrode 64, while the trailing portion thereof has been annihilated by the negative voltage applied to electrode 60. It will in fact be seen from the Figures that the first lens injected, representing the first binary number (as well as any other lenses previously injected) is moved along its corresponding lens channel by one electrode for each one-third of a complete cycle of the driving voltages, appears at any time under that pair of adjacent electrodes which are then positive, and is stabilized by the electrodes at each end thereof which are negative. Because adjacent lenses in the same channel have a strong tendency to expand along their lengths and merge with each other and are prevented from so doing only by the negative local field applied between them, the negative or inhibiting voltages are advantageously substantially greater than the positive supportive voltages, as shown and described above. Also, to assure a sequence which will reliably move the lens always in the desired down-channel direction rather than in the opposite direction, the positive supportive field is preferably applied somewhat after the negative inhibiting field; in the waveform of FIG. 7, this is accomplished by providing a steeper edge for the negative-going voltage transition than for the positive-going transition.

FIGS. 8E and 8F show the same operation occurring with respect to the second injected binary number as occurred for the first binary number in FIGS. 8B and 8C; thus the tips of the two blades in the two least-significant-digit positions are advanced first to positions under the first driving electrode, then to positions for which their tips are positioned under the down-channel side of the second driving electrode, at which time the blades are amputated by the negative voltages applied to the corresponding two gating electrodes to form the two lenses of FIG. 8F representing the numeral 00011.

FIGS. 8G, 8H and 8I illustrate the injection of the third binary number 01100 by the closing of the two switches 176 and 178 in response to the operation of the binary register, and the subsequent automatic operation of the driving voltages in drawing out the corresponding blades, amputating them, and causing the blades to return to their stored positions while leaving the desired lenses. Again, during each one-third cycle of operation the previously-injected lenses representing binary information are advanced one electrode at a time toward their extreme down-channel position.

It will be understood that the last binary numeral 10101 is inserted in this same manner by the closure of switches 172, 176 and 180 during the next cycle of driving voltage, at the end of which cycle of operation the lens array shown in FIG. 2 results. At this time, the shutter of the photographic arrangement of FIG. 1 is operated to record a light image of the lens array on the film F, and the film is then advanced in preparation for entry of another array of sets of number-representing lenses into the crystal plate 20. The operation of the shutter and of the film advance is preferably accomplished automatically and rapidly in response to appropriate signals derived from the discriminator circuit D, of a separate timing channel, although this may be done manually if desired.

Figure 9A:
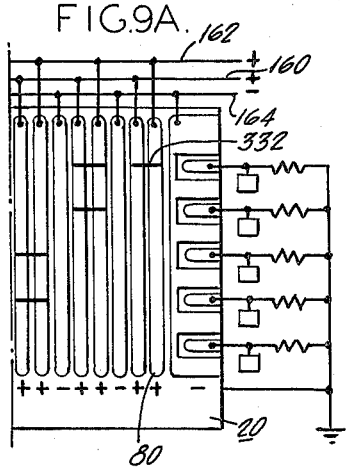
FIG. 9A through 9E are fragmentary schematic representations, with parts omitted, of the domain device of FIG. 2, showing lens domain configurations and positions during those phases of operation during which lens domains are detected and expelled from the crystal.
Figure 9B:
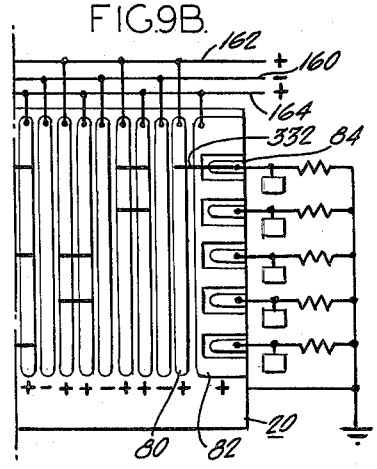
Figure 9C:
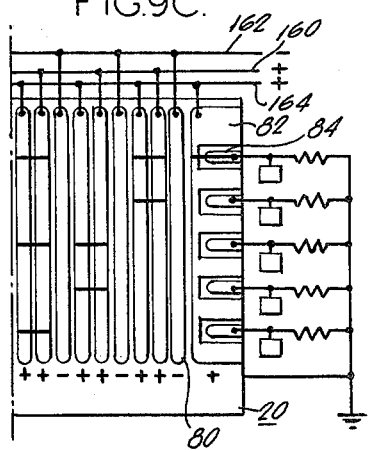
Figure 9D:
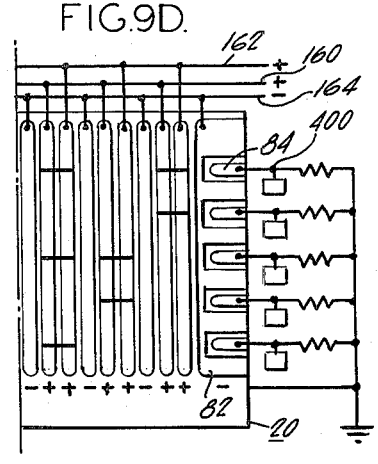

After the lens array has been photographed, a new set of binary numerals may be injected in the same manner described previously, with the lenses of the already-photographed array being driven out of the crystal plate 20, one set at a time, at the exit end thereof by the same automatic operation of the driving voltages, as illustrated in FIG. 9A through 9D for the case of the first two previously injected numerals. Thus FIG. 9A shows the first two injected numerals as they are positioned at the time of the photographing, with voltages on buses 164, 160 and 162 respectively minus, plus and plus. During the next one-third cycle of operation (See FIG. 9B), the voltages on these buses become respectively plus, minus and plus as shown, with the result that the first-injected lens 332 is advanced into a position extending under driving electrode 80 and under the final electrode 82 and detector electrode 84 as shown. During the next one-third cycle of operation, as shown in FIG. 9C, electrode 80 becomes negative and the lens is thereby advanced and confined to the region of the crystal controlled by the final electrode 82, including the region under the detector electrode 84. During the next one-third cycle of operation, as shown in FIG. 9D, the final electrode 82 becomes negative and the lens is driven completely out of the down-channel edge of the crystal. The strain field beneath the detector electrodes 84, 86, 88 90 and 92 that is induced by the field applied via electrode 82 readily moves the lens domain beneath the detectors and out of the crystal even though the external field is not applied directly on the lens itself.

Figure 9E:
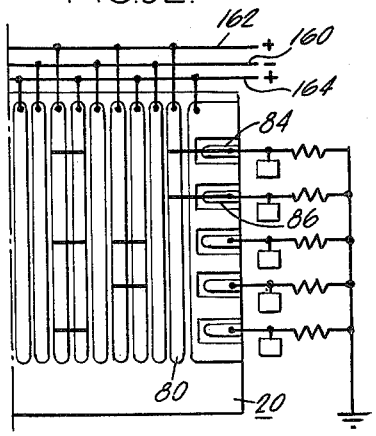

When the latter lens is driven out of the crystal by way of the region beneath the final electrode, a distinctive lens-indicating detector signal is produced on detector electrode 84 and at detector output terminal 400 which will be of a certain form, magnitude and duration indicative of the presence of a binary 1 in the least-significant-digit column and discernible by the corresponding discriminator D. At the same time, the corresponding output terminals of the other detector electrodes will have distinctly different voltages thereon, since no lens is being exited past any of the corresponding detector electrodes. The presences and absences of lens-indicating output voltages from the discriminators D therefore also represents the entire binary number exited from the crystal, thereby reproducing the binary number in electrical form as parallel digital binary number information. As suggested by FIG. 9E showing the next step in operation, this operation will be repeated for each set of lenses representing a binary number as that set of lenses exits from the crystal. The electrical binary information from the discriminators may be used as a delayed version of the input information applied at the input end of the crystal plate, the crystal plate thereby serving as a delay line for numerical information; the detected output information may be also used for other control purposes, such as controlling the times at which new information is inserted into the plate, the times of operation of photographic equipment, or for other purposes. If desired, one of the lens channels can be used as a marker channel instead of for numerical information, in which case injection of a lens in the marker channel at the input end would be accomplished when a new set of information is to be inserted and presented as an array, and the detection of this marker lens at the output end of the crystal would provide an indication that the photographed array of lenses has then been completely removed from the crystal plate and a new array has been formed for subsequent photographing.

It will therefore be appreciated that, in the embodiment of the invention just described, blade domains are produced and stored at an input end of the crystal plate in predetermined known positions; are drawn out selectively when a lens is to be produced, by means of localized fields, preferably electric fields; the extended portion of the blade near the tip is amputated to produce a lens, by means of localized inhibiting or annihilating fields; the blade is restored to its stored, contracted condition; the lens is stabilized in position by localized inhibiting fields at both ends thereof and by supportive fields in the lens region; and the lens is then moved as desired to successive positions by switching the voltages on the electrodes supplying the localized fields, so that the location of the supportive fields and of the inhibiting fields at each end thereof in effect moves through the crystal along the longitudinal direction of the lens, as desired. In addition, detector means are provided at the output end of the crystal plate to provide electrical indications of when a lens reaches the exit end of the crystal. In the example given, binary number information is represented by the configuration of the lens array in the crystal plate, and is photographically converted to a permanent record by passing light through the plate according to the general arrangement shown in FIG. 1.

It will be understood that a relatively small number of channels and driving electrodes have been shown in this embodiment in the interest of clarity and convenience of exposition, and that many more channels and/or many more electrodes may be used. For example, one might use 100 channels and 300 electrodes to form an array of 10,000 possible lens positions, i.e. 10,000 bits of binary information. Such a device may be used, for example, as a digital binary page composer wherein a long sequence of binary bits of information is inserted into the plate to form a lens array of predetermined known order and configuration and then photographed to provide a "page" serving as a record of perhaps 10,000 bits of information for later reference and possible optical readout.

As an example only, for a GMO crystal plate 0.28 mm. in thickness, 15 mm. long and 8 mm. wide, the driving electrodes may be 5.5 mm. long and 0.3 mm. wide with a gap spacing adjacent each of them of about 0.06 mm. to facilitate easy motion of the domains from one electrode to the next. The blade storage electrode may be about 1.5 mm. by 5.5 mm., each wedge-shaped unelectroded region therein having a base width at the crystal edge of about 0.5 mm. and a height from base to apex of about 1.2 mm. The final electrode may be about 5.5 mm. in length and 2.5 mm wide, each cut-out therein being about 1 by 0.3 mm. and each detector electrode about 0.8 by 0.2 mm. The applied supportive and inhibiting voltages may be about 300 volts and of opposite polarities, and the frequency of the 3-phase driving voltage may be about 50 KHz, producing lens speeds of about 1,000 cm./sec. The lens dimensions (in the c-plane) may then be about 0.02 by 0.66mm. The electrodes and the gaps between electrodes may be overcoated with a dielectric film (e.g. a layer of $SiO_2$ 1000 Angstroms in thickness) to assure absence of arcing between electrodes.

The crystal materials which can be used in the present invention are those which are of a coupled ferroelastic-ferroelectric material exhibiting uniaxial electric polarization. As set forth in my U.S. Pat. No. 3,732,549, the materials in which these properties are known to be possible are defined by the following Aizu point groups: 42mFmm2; 4F2; 222F2; 42mF2; 422F2; 622F2; 43mFmm2; and 23F2. Crystals falling within the first three of these classes (42mFmm2, 4F2 and 222F2), have a uniaxial ferroelectric phase and are especially suitable for use in the present invention, although the other classes listed above can also be used if steps are taken to suppress polarization along all but one of the allowed axes.

The preferred material comprises $\beta'$-gadolinium molybdate and the class of related cyrstals having the $\beta'$-gadolinium molybdate crystal structure. The latter class may be represented by the formula $(R_xR'_{1-x})_2 O_3.Mo_{1-e} WeO_3$ wherein R and R' represent scandium, yttrium, or a rare earth element having an atomic number of from 57 to 71, $x$ is from 0 to 0.1 and $e$ is from 0 to 0.2.

While in the embodiment described each lens is moved in one direction only, it will be understood that it can also be moved in the opposite direction by the application of an appropriate sequence of control voltages whereby the supportive field and the stabilizing inhibiting field at opposite ends of the lens are caused to move together but in the opposite direction. Any selected lens can also be annihilated while in the plate by the removal of the supportive polarity of voltage where the supportive field otherwise appears. This is because the lenses are inherently unstable in regions of a crystal through which the lenses can be moved pursuant to the invention, and will disappear if the supportive field is not supplied.

The method described above produces stored blade domains by scanning of a planar domain wall through wedge-shaped unelectroded regions; however, they can also be produced by a process in which controlled crystal damage is caused to occur at the crystal c-surface above the desired position of the blade domain. One preferred technique for doing this is to draw a lightly-loaded rounded point across the c-surface of the crystal along a (110) direction, to "dent" a region approximately 10 microns by 300 microns in that surface. A single blade domain of either sign is thereby nucleated and retained beneath the dent. The c-surface can be either electroded or unelectroded during this procedure; the crystal need not be poled while being damaged, and the blades appear during the damaging. Passing a planar wall across this damage changes the polarity of polarization of the blade. A blade so produced will resist even a strong annihilating field, and is so humidity-insensitive that it operates even while immersed in water. Another method of doing this is to bombard the region to be damaged with glass spheres about 25 microns in diameter applied in an air jet at an air pressure of about 40 p.s.i.; this procedure is effective even when the balls are applied to a surface covered with a $In_2O_3$ electrode, and acts through the electrode without causing removal of the electrode, so that a blade-supporting electric field can readily be applied to the surface region directly over the blade domain via the still-remaining electrode material.

These same techniques of controlled crystal damage can be used to stabilize a lens domain which can then act as a nucleation site for making more lens domains at either end by drawing out and amputating.

It will also be appreciated that lens and blade domains can be formed, controlled, and moved in non-parallel twinning planes in a crystal so that more complicated device configurations than illustrated here are possible. For example in gadolinium molybdate crystals some blade and lens domains may be formed and moved along one twinning plane in one part of the crystal while others are moved along the orthogonal twinning plane in a different part of the same crystal.

Blade domains can also be formed by first forming a zig-zag domain wall as described in the above-cited co-pending application Ser. No. 318,502 of Flippen, stabilizing the overall lateral position of the zig-zag wall, and drawing out the tip of a zig-zag along the direction toward which its tip points, by applying a local supporting field to the region of the crystal just ahead of the tip.

In the foregoing a method is specifically described for producing lens domains by amputation of blade domains. However, lens domains may also be generated by other methods. In general, nucleation of a lens domain appears to be facilitated by large strain gradients, rather than merely large strains. Suitable strain gradients may be produced electrically, thermally or mechanically. Thermal generation may be accomplished, for example, by applying a current pulse through a shaped thin-film heater element formed on the crystal surface. Electric field gradients can be used to generate lenses in the gap between two adjacent surface electrodes by applying different voltages to the electrodes to produce large opposing electric fields adjacent the gap. A suitable field gradient is about $5 \times 10^6$ volts/cm$^2$. In this connection, it is pointed out that in lens control electrode systems such as that shown in FIG. 2, the control voltages used should not be so excessively high as to cause strain gradients which will generate new lenses where they are not wanted. Lenses can also be nucleated by applying an electric field to a crystal surface by way of a pointed electrode touched to the surface at the desired lens location.

In addition, lenses can also be nucleated and permanently stabilized by crystal imperfections (e.g. second crystallographic phases) or by localized crystal damage (e.g. collapsing the crystal structures at the crystal surface by applied pressure). Smaller regions of second phases in the crystal, or smaller amounts of damage to the crystal, although not sufficient to produce a lens or blade directly, tend to bias the crystal in the region of the defect so that lenses or blades can be nucleated or supported with smaller fields in such regions, and also can be used to limit the mobility of lens or blade domains where so desired.

Various combinations of electric, mechanical and thermal techniques may be used to generate lens or blade domains, in particular so as to permit use of smaller applied electrical fields for this purpose.

In the arrangement of FIG. 2, multiple localized electrodes are used only on one face of the crystal, in a relatively simple array for the particular application shown.

However, any of a large variety of electrode configurations and combinations may be used for different applications. For example, both major faces of the crystal plate may be provided with arrays of local electrodes, such as one set of parallel electrodes on one face and another set of parallel electrodes on the opposite face and extending at right angles to the first set to form a coincidence matrix; by applying appropriate voltages to various combinations of the rear and front electrode arrays, domain-supportive or inhibiting fields can be produced at various selected positions in the crystal, as for binary information storage or delay. Also, while in FIG. 2 the lenses formed extend under two adjacent driving electrodes, it is possible to construct systems in which each lens underlies a single electrode and has a length about equal to the width of the electrode. In this connection is is pointed out that, for improved control of the lens and blade domains, the length of the lens or blade is preferably at least twice the crystal thickness in the direction normal to the c-plane. Thus where the lens has a length about equal to the width of the adjacent supportive electrode, the thickness of the crystal plate is preferably no greater than one-half the electrode width. Driving voltage techniques using four or more phases of driving signals, rather than the three phases specifically shown and described, are also contemplated.

In some instances it is advantageous to use mechanical clamps to clamp all four margins of the crystal plate, rather than only two sides as shown in FIG. 2, to ensure against generation of undesired planar domain walls in complex arrays of lens or blade domains.

The utility of blade domains is not limited to use in generating lenses, and they are useful themselves for other purposes. For example, referring to FIG. 10 and 11 there is shown an arrangement in which blades are stored along one edge of a crystal plate and extended at will to a predetermined tip position by means of time and space variant electric fields. The resultant configurations of blades so produced may be used to represent information, such as binary number information, and may be optically sensed and photographically recorded if desired.

More particularly, a crystal plate 500 which may be like that described in the previous embodiment is provided with clamps 502 and 504 and with wall storage electrode 506. Again, a blade storage electrode 508 is provided in which blades 510, 512, 514 and 516 are generated and stored. Electrodes 520, 522, 524 and 526 are applied to limited regions aligned respectively with blades 510 through 516, and a grounded back electrode 530 is provided over the entire surface of the opposite side of the crystal plate 500. A pair of direct voltage sources 532 and 534 are connected in series-aiding relationship with the point 536 between them connected to ground. Electrodes 520, 522, 524 and 526 are connected to the switch arms of the corresponding respective single-pole double-throw switches 540, 542, 544 and 546. One contact of each of the latter switches is connected to the negative terminal of source 532, while the other contact of each of the switches is connected to the positive terminal of source 534. Accordingly, depending upon the position of the arms of the four switches, the corresponding ones of the electrodes 520 through 526 may be supplied with either a negative or positive potential with respect to ground. An arresting electrode 550 is also provided on the top surface of the crystal along the margin thereof opposite that on which the blade storage electrode is located, and is connected to the positive terminal of source 534, while blade storage electrode 508 is connected to the negative terminal of source 532.

The crystal plate in this example is so poled that reversed domains therein are supported by negative voltages applied to the top electrodes. Thus, the negative voltage applied to the blade storage electrode assists in maintaining the stored blades. Application of a negative potential to any of the electrodes 520 through 526 results in the drawing out of the corresponding blade beneath the selected electrodes so that the tip of the blade extends to the opposite end of the selected electrode. Extension of the blade beyond this point is prevented, and the tip stabilized near the right-hand extreme of the selected electrode, due to the positive inhibiting potential applied to electrode 550 from source 534.

Figure 10:
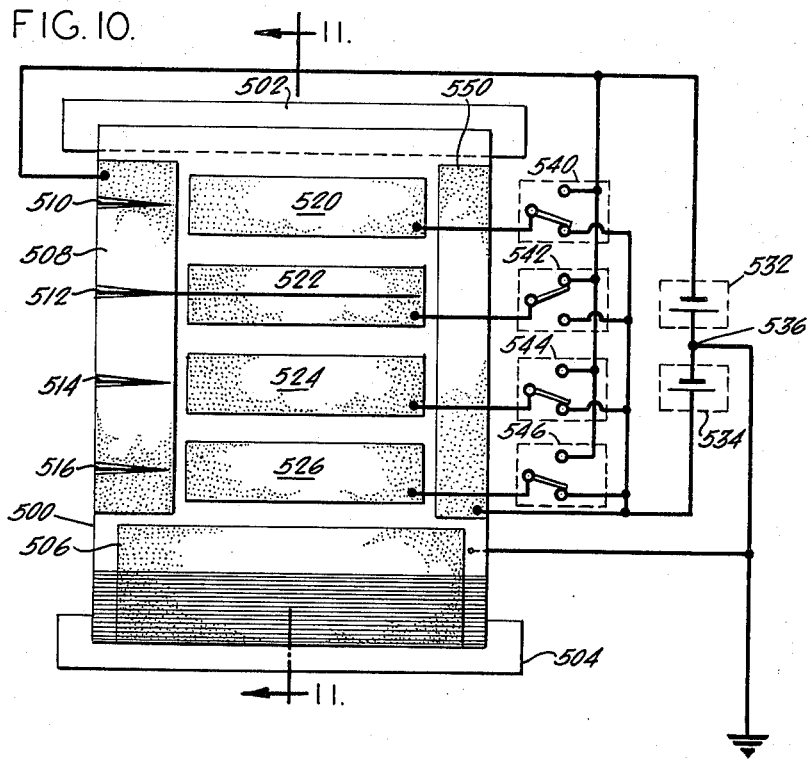
FIGS. 10 and 11 are plan and sectional views, respectively, of another embodiment of the invention using blade domains, without lens domains.
Figure 11:
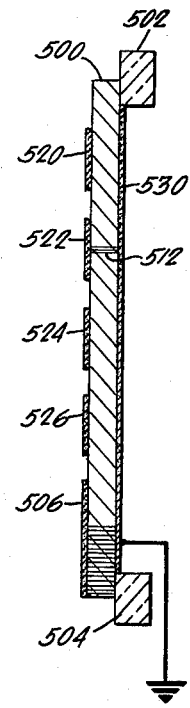

Accordingly, by setting selected switch arms of the switch 540 through 546 to the position for which they supply their corresponding electrodes with negative potential, blades can be caused to extend outward beneath these electrodes, while switches in the opposite position will not produce any such blade extension. In the particular setting shown in FIG. 10, switch 542 is positioned so that its corresponding electrode is negative, while the other switches are thrown to the positions for which their corresponding electrodes are positive. Accordingly, only the electrode 522 has a blade extending beneath it. Assuming that the top electrode in FIG. 10 represents the least significant digit of a binary number, and the other lower electrodes, represent correspondingly more significant digits, the particular configuration of switches and blades illustrated in FIG. 10 would represent the binary number 0010. The blade array of FIG. 10 can be sensed optically and recorded permanently, or sensed by other means.

While in FIG. 10 there is shown an example in which the blade is extendable only to one stable position, it will be understood that by utilizing additional supportive electrodes and inhibiting electrodes and appropriate switching of the voltages applied thereto, the blade can be caused to be extended to any desired number of different stable lengths, and each particular length to which it can be extended can be utilized to represent information such as binary number information. In such uses, a blade is generated the tip of which can be moved, controlled and stabilized in different positions by the application of time-and space-variant localized fields, in this example electric fields, although strain fields can also be utilized if desired.

Accordingly, it will be appreciated that the invention is in no way limited to the particular examples shown and described in detail, which merely illustrate examples of systems in which blades and lenses are generated, stabilized and controlled in configuration, location, and motion, at will. The invention may therefore be embodied in any of a large variety of diverse forms without departing from the spirit and scope of the invention as defined by the appended claims.

What is claimed is:

1. A controlled electric polarization domain device, comprising:
a single crystal of a coupled ferroelastic-ferroelectric material exhibiting uniaxial electric polarization;
means for producing in said single crystal an electric polarization domain region of electric polarization reversed with respect to that of adjacent material of said crystal, at least one portion of which domain: (a) is elongated along a predetermined twinning plane in said crystal, (b) has at least one tip spaced inwardly from that surface of said crystal toward which said tip extends, and (c) extends less than completely across said crystal in a direction perpendicular to said direction of elongation; and
means for producing localized fields in said single crystal adjacent said tip, selectively to control the position of said tip in said crystal.

2. The domain device of claim 1, in which said means for producing said localized fields comprises means for applying a domain-supportive field to the portion of said crystal within said domain tip and means for applying a domain-inhibiting field to another portion of said crystal adjacent said tip and outside said domain region.

3. The domain device of claim 1, in which said means for producing said localized fields comprises spaced-apart electrodes on said crystal and means for applying different voltages to said electrodes.

4. The domain device of claim 1, comprising means for varying said fields as a function of time to vary the position of said tip.

5. The domain device of claim 1, comprising:
means for applying a domain-supportive field to the part of said crystal containing said domain tip;
means for applying a domain-inhibiting field to another portion of said crystal adjacent said tip and outside said domain; and
means for progressively changing, along the direction of the length of said domain, the positions at which said supportive and inhibiting fields are applied to said crystal to produce controlled motion of said tip.

6. The domain device of claim 1, comprising means for sensing said one portion of said domain region.

7. The domain device of claim 1, in which said domain region is a blade-domain region.

8. The domain device of claim 1, in which said domain region is a lens-domain region having another opposite tip in addition to said one tip, said other tip being spaced inwardly from that surface of said crystal toward which said other tip extends, said domain device also comprising means for producing localized electric fields in said crystal adjacent said other tip selectively to control the position of said other tip.

9. The domain device of claim 1, in which said material is one characterized by one of the following Aizu point groups: $\overline{4}2mFmm2$; $\overline{4}F2$; and $222F2$.

10. The domain device of claim 1, in which said material is one characterized by the following Aizu point group: $42mFmm2$.

11. The domain device of claim 10, in which said material has the formula $(R_xR'_{1-x})_2 O_3 \cdot 3Mo_{1-e} W_e O_3$ wherein R and R' represent scandium, yttrium, or a rare earth element having an atomic number of from 57 to 71, $x$ is from 0 to 0.1 and $e$ is from 0 to 0.2.

12. A controlled electric polarization domain device, comprising:
a single crystal of a coupled ferroelastic-ferroelectric material exhibiting uniaxial electric polarization;
means for generating in said crystal an electric polarization lens-domain region having opposite tips spaced inwardly from those surfaces of said crystal toward which they extend;
means for applying a local domain-supportive field to said lens domain; and means for applying domain-inhibiting fields to portions of said crystal adjacent but outside said tips to stabilize the position of said lens domain.

13. The device of claim 12, in which said fields comprise electric fields.

14. The device of claim 12, in which said means for applying a domain-supportive field and said means for applying a domain-inhibiting field comprise localized electrodes on said crystal and means for applying different voltages thereto.

15. The device of claim 12, comprising means for varying the positions of said domain-supportive field and said domain-inhibiting fields to effect controlled movement of said lens domain.

16. The device of claim 12, comprising means for sensing said lens domain.

17. The domain device of claim 12, in which said material is one characterized by one of the following Aizu point groups: 42mFmm2; 4F2; and 222F2.

18. The domain device of claim 17, in which said material is one characterized by the following Aizu point group: 42mFmm2.

19. The domain device of claim 18, in which said material has the formula $(R_x R'_{1-x})_2 O_3 \cdot 3Mo_{1-e} W_e O_3$ wherein R and R' represent scandium, yttrium, or a rare earth element having an atomic number of from 57 to 71, $x$ is from 0 to 0.1 and $e$ is from 0 to 0.2.

20. An electric polarization domain device, comprising:
a single crystal of a coupled ferroelastic-ferroelectric material exhibiting uniaxial electric polarization; and
means for generating and stabilizing an array of electric polarization lens domains in predetermined controlled positions in said crystal.

21. The device of claim 20, comprising means for moving said lens domains controlledly to predetermined positions in said crystal.

22. The device of claim 20, comprising means for controlling the arrangement of said lenses in said array in response to signals representing binary number information.

23. The device of claim 20, comprising means for applying changing local fields to said crystal to move said lenses along the directions of their lengths.

24. An electric polarization domain device, comprising:
a single crystal of a coupled ferroelastic-ferroelectric material exhibiting uniaxial electric polarization;
means for generating in said crystal an electric polarization blade domain having a tip spaced inwardly from the surface of said crystal toward which it extends;
means for applying a domain-supportive field to said blade domain; and
additional means for providing a domain-inhibiting field to portions of said crystal adjacent but outside said tip to stabilize the position of said tip.

25. The device of claim 24, in which said domain-supportive field and said domain-inhibiting field are electric fields.

26. The device of claim 24, in which said means for applying said domain-supportive and domain-inhibiting fields comprise localized electrodes on said crystal and means for applying different voltages thereto.

27. The device of claim 24, comprising means for varying the positions of said domain-supporting field and said domain-inhibiting field to effect controlled movement of said blade domain tip.

28. The domain device of claim 24, comprising means for sensing said blade domain.

29. The domain device of claim 24, in which said material is one characterized by one of the following Aizu point groups: 42mFmm2; 4F2; and 222F2.

30. The domain device of claim 24, in which said material is one characterized by the following Aizu point group: 42mFmm2.

31. The domain device of claim 30, in which said material has the formula $(R_x R'_{1-x})_2 O_3 \cdot 3Mo_{1-e} W_e O_3$ wherein R and R' represent scandium, yttrium, or a rare earth element having an atomic number of from 57 to 71, $x$ is from 0 to 0.1 and $e$ is from 0 to 0.2.

32. An electric polarization domain device, comprising:
a single crystal of a coupled ferroelastic-ferroelectric material exhibiting uniaxial electric polarization;
means for generating an electric polarization blade domain in said crystal;
first electrode means responsive to an applied domain-supportive voltage for expanding said blade domain along its length; and
second electrode means responsive to an applied domain inhibiting voltage for stabilizing said blade domain in its expanded position.

33. An electric polarization domain device, comprising:
a single crystal of a coupled ferroelastic-ferroelectric material exhibiting uniaxial electric polarization; and
means for generating and stabilizing an array of electric polarization blade domains of predetermined selectively controlled lengths in said crystal.

34. The device of claim 33, comprising means for controlledly and selectively changing the lengths of said blade domains.

35. The device of claim 33, comprising means for controlling selectively the lengths of said blade domains in response to signals representing binary number information.

36. Controlled electric polarization domain apparatus, comprising:
a single crystal of a coupled ferroelastic-ferroelectric material exhibiting uniaxial electric polarization;
means for producing in said crystal an electric polarization lens domain;
a plurality of separate electrodes on said crystal; and
electrical means for applying a repeating sequence of voltages to said electrodes to control the motion of said lens domains.

37. The apparatus of claim 41, in which said electrical means comprises means for generating N different phases of a periodic electrical waveform, where N is greater than 1, and means for supplying each of said N different phases of electrical waveform to N corresponding different sets of said electrodes.

38. The apparatus of claim 37, in which N is 3.

39. The apparatus of claim 38, in which each of said sets comprises every third one of said electrodes along the direction of motion of said lens.

40. The apparatus of claim 39, in which said waveform is of the lens-inhibiting polarity for about one-third of each period of said waveform and is of the lens-supportive polarity for about two-thirds of each said period.

41. The apparatus of claim 40, in which the transitions of said waveform from the lens-supportive polarity to the lens-inhibiting polarity occur more quickly than the transitions thereof in the opposite sense.

42. Electric polarization lens domain apparatus, comprising:
- a single crystal of a coupled ferroelastic-ferroelectric material exhibiting uniaxial electric polarization;
- means for producing a plurality of stored electric polarization blade domains spaced from each other along one side of said crystal and each extending along the same predetermined direction to define a number of lens channels in said crystal equal to the number of said blade domains;
- a plurality of input electrodes each positioned on said crystal adjacent the tip of a corresponding one of said stored blade domains and along the corresponding channel in said crystal;
- means for applying a blade-domain supportive voltage to any selected ones of said input electrodes to cause corresponding selected one of said blade domains to expand along the corresponding channels so that the tips of the expanded blade domains underlie said selected input electrodes;
- first driving electrode means spaced from said input electrodes along said predetermined direction and responsive to blade-domain supportive voltages applied thereto for further expanding said selected blade domains so that the tips thereof are positioned substantially under said first driving electrode means;
- means for applying a blade-domain inhibiting voltage to said input electrodes while said blade domains are in said further-expanded condition to annihilate the portions of said further-extended blade domains beneath said input electrodes, return said selected blade domains to their stored state, and thereby form an electric polarization lens domain from each of said further-extended blade domains;
- second driving electrode means spaced along said channels from said first driving electrode means;
- means for applying lens-supportive voltages to said second driving electrode means at positions adjacent but along said channel from the forward tip portions of said lenses to extend said lenses further along said channels and for applying lens-annihilating voltages to the opposite tip portions of said lens domains to annihilate them, thereby to effect controlled motion of said lenses along said channels.

43. The apparatus of claim 42, comprising optical means for sensing the locations of said lens domains.

44. The apparatus of claim 42, comprising electrical means for sensing the locations of said lens domains.

45. Apparatus for sensing an electric polarization domain tip in a crystal of coupled ferroelectric-ferroelastic material exhibiting uniaxial electric polarization, comprising:
- a driving electrode on a surface of said crystal;
- a detector electrode adjacent said driving electrode but spaced therefrom along a direction of permissible motion of a lens domain in said crystal;
- means for forming an electric polarization lens domain in said crystal extending along said direction and at least in part under said driving electrode, and means for applying a lens-supportive voltage to said driving electrode to support said lens domain and to extend it under said detector electrode;
- means for changing said lens-supportive voltage to a lens annihilating voltage to move said lens domain beyond said detector electrode; and
- means for sensing changes in the electrical condition of said detector electrode due to motion of said lens domain under said detector electrode.

46. The apparatus of claim 45, in which said driving electrode extends on both sides of said detector electrode along said direction.

47. The apparatus of claim 45, in which said driving electrode extends along said direction to an edge of said crystal and is provided with a cutout therein extending from said edge, and said detector electrode is positioned within said cutout.

* * * * *

UNITED STATES PATENT OFFICE
CERTIFICATE OF CORRECTION

Patent No. 3,921,154      Dated November 18, 1975

Inventor(s)    John R. Barkley

It is certified that error appears in the above-identified patent and that said Letters Patent are hereby corrected as shown below:

In the Abstract, line 7, "C-cut" should read -- c-cut --.

Column 4, line 9, "spacedapart" should read -- spaced apart --;

Column 10, line 37, "188" should read -- 118 --.

Column 11, line 9, "clamp" should read -- clamps --.

Column 18, lines 15, 16 and 17, a bar should be placed over all the initial "4's", with the exception of "422F2" on line 15.

Column 22, line 54, claim 10, a bar should be placed over the initial "4" of "42mFmm2".

Column 23, lines 19 and 22, claims 17 and 18, a bar should be placed over the initial "4's" of the Aizu point groups.

Column 24, lines 7 and 10, claims 29 and 30, a bar should be placed over the initial "4's" in the same Aizu point groups.

Signed and Sealed this

Twenty-seventh Day of July 1976

[SEAL]

Attest:

RUTH C. MASON
*Attesting Officer*

C. MARSHALL DANN
*Commissioner of Patents and Trademarks*